John F. Holt,

Impvd Rollers for Clothes Wringers.

4473

REISSUED JUL 18 1871

Witnesses.

R. H. Whittlesey

S. M. Roe

Inventor.

John F. Holt by his attorney

A. Pollok

UNITED STATES PATENT OFFICE.

JOHN F. HOLT, OF PROVIDENCE, R. I., ASSIGNOR, BY MESNE ASSIGNMENTS, TO THE BOSTON BELTING COMPANY, OF BOSTON, MASS.

IMPROVEMENT IN ROLLERS FOR CLOTHES-WRINGERS, &c.

Specification forming part of Letters Patent No. 49,030, dated July 25, 1865; reissue No. 3,930, dated April 19, 1870; reissue No. 4,473, dated July 18, 1871.

*To all whom it may concern:*

Be it known that I, JOHN F. HOLT, of the city and county of Providence and State of Rhode Island, have invented a new and useful Improvement in Rolls for Clothes-Wringers and other similar purposes; and I hereby declare that the following is a full and exact description of the same, reference being had to the accompanying drawing making a part of this specification, in which—

Figure 1:
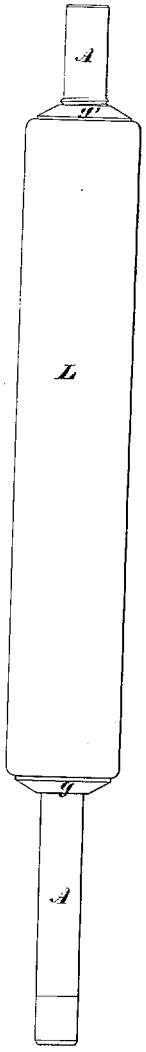
Figure 2:
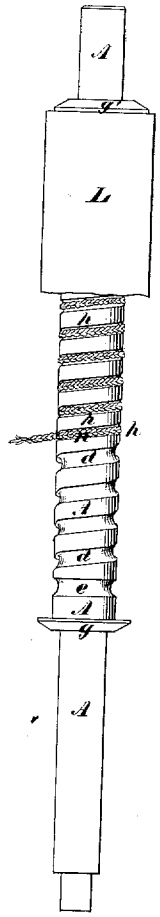

Figure 1 is a longitudinal view of my improved roll complete; and Fig. 2 is a sectional view of the same, which exhibits the improved mode of construction.

Similar letters of reference indicate corresponding parts in both figures.

This invention relates to a mode of forming a cylinder of India rubber or other vulcanizable substance, and, by substantially the means herein described, securing the same upon a mandrel or shaft, so that the two may be permanently united—that is to say, incapable of being detached from or slipping upon each other. The great difficulty which has hitherto been experienced in the application of India rubber, gutta-percha, and like material, in the construction of rolls for the purpose mentioned, is that of preventing the exterior cylindrical body of India rubber, &c., from becoming detached from or slipping on the mandrel instead of turning with it, in which case the roll is rendered inoperative and useless; and, although a great many ingenious contrivances have been employed to overcome this difficulty, I am not aware that any such have succeeded in doing so without rendering the roll otherwise objectionable. My invention for this purpose consists: 1st, in a roll of vulcanized India rubber for wringing and other like machinery or purposes, having its body secured to the shaft by means of a strip or cord of metal or other inelastic substance wound around and fastened to the shaft so as to be incapable of turning thereon, and embedded in the roll. 2d, in the method of binding upon the mandrel or shaft, by means of a strip or cord of metal or other inelastic substance wound around it so as to be incapable of turning thereon, a strip of unvulcanized rubber, and finishing the roll upon such strip so bound, in the manner hereinafter described, so that the outer portion of the roll may be united, by the act of vulcanizing, with the strip bound on the shaft. 3d, in constructing the roll for the purpose stated, by combining, with a spirally-grooved mandrel, a preliminary strip or thickness of vulcanizable compound, bound thereon by means of any suitable inelastic cord, braid, or thong wound over said sheet in the spiral groove around said mandrel, so as to be incapable of turning thereon, and a suitable cylindrical body of a vulcanizable compound, forming the outer portion of the roll, and afterward vulcanizing the whole together on the mandrel, as hereinafter described. 4th, in a wringer-roll composed of a vulcanized India-rubber body fixed upon its shaft by means of a cord, which, while embedded in and forming part of the body of the roll, is wound spirally around and secured to the shaft, as hereinafter set forth.

To enable others skilled in the art to make and use my invention, I will proceed to describe the manner in which the same may be carried into effect.

Upon a mandrel or shaft, and on the part thereof which is to be occupied by the roll, I apply a sheet or thickness of unvulcanized, but vulcanizable, India-rubber compound, and tie the same with a suitable binding-cord or thong (which may consist of a single cord of cotton, twine, or other material, preferably metal or like inelastic substance, or of three or more strands combined) around the shaft, and secure the ends of the binding-cord in such a way that it cannot slip upon the shaft. When this is done I wrap the surface thus formed with vulcanizable compound of India rubber until the requisite thickness or body is obtained to form the roll. The whole is then vulcanized in the usual manner known to those acquainted with the manufacture of India-rubber articles. A roll is thus produced in which the vulcanized and elastic body is bound upon the shaft by means of the cord embedded in and surrounded by the material of which the body of the roll is composed, and wound around and fastened to the shaft so as to be incapable of turning thereon.

As an illustration of this method of constructing India-rubber rolls, I have shown in the accompanying drawing the mandrel A provided with a spiral groove, *d*, terminating at each end in an annular score, *e*, which is to receive the end of the binding-cord or thong *f*. There may also be used two fixed collars, *g*, between which the elastic roll will be held so as to be prevented from any possible end or lateral play. Upon a grooved shaft, such as described, the roll may be formed as follows: The grooved portion of the mandrel between the collars is wrapped with a suitable thickness—say one-sixteenth of an inch—of the soft compound of India rubber or other vulcanizable gum, *h*, completely enveloping this portion of the mandrel. A suitable binding-cord or thong, *n*, which may consist of a single cord, or three or more strands of cotton or other twine or cord braided together, is then prepared, and may be saturated or coated with India-rubber cement, (so called;) or the binding device may consist of a strip of metal, brass, copper, or iron, of a form and size that will, when wound upon the rubber in the groove, fit and completely fill the same. The thong or binding device thus formed and prepared I wind in the spiral groove of the mandrel, from the score *e* at one end to the like score at the other end, upon the rubber compound or preliminary sheet, which is thus compressed into a spiral corrugated form and bound tightly in the groove, forming, as it were, a female screw of India rubber corresponding with the male screw on the mandrel, and presenting, by a combination of the binding-braid or thong with the portion of the rubber compound which protrudes between the convolutions of the binding, an even and regular cylindrical surface, to and with which a subsequent thickness or body of the rubber compound or like material would adhere and unite, if properly applied, as well to the binding covered with cement as to the rubber compound itself. After the preliminary thickness *h* of material is thus bound and secured on the mandrel I wrap the surface thus formed with the vulcanizable compound of India rubber or like gum by winding a sheet of the same thereon until a sufficient thickness or body is obtained to form the required diameter of the roll L. The roll is then subjected to the well-known process of vulcanizing India rubber and like gums, which unites the body of the compound last put on solidly with that which is bound upon the mandrel, confining the whole securely and permanently thereto, and rendering the roll uniformly elastic and fit for use.

Instead of forming or constructing the roll L of India rubber permanently upon the mandrel, as above described, I also contemplate, by means of the above-specified process, constructing the rubber portion in the same way upon a temporary mandrel formed like that shown and described, except that the annular scores *e* are omitted, so that the India-rubber cylinder L, after being vulcanized, may be unscrewed from the temporary mandrel upon which it was formed or made up, as described, and screwed on the mandrel to which it is to be permanently attached for use on the machine, in which case one only of the collars *g* is fixed on the mandrel, the other one, *g'*, being removable by means of a screw-thread cut therein and on the mandrel to admit of the screwing of the rubber cylinder thereon. It will be seen that the mode described of binding a preliminary thickness of India-rubber compound on the mandrel, made as described, forms a complete and perfect screw-thread within the rubber cylinder, which derives greater firmness from the inelastic binding device, and is therefore a more substantial and effective means of confining the cylinder on the mandrel than could be obtained by any process at present known to me of molding in the rubber alone, although approximate results might be obtained by so molding the rubber in connection with a mandrel substantially like that described.

Having described my invention, and the manner in which the same is or may be carried into effect, what I claim, and desire to secure by Letters Patent, is as follows:

1. A roll of vulcanized India rubber for wringing and other like machines, having its body secured to the shaft by means of a cord or strip of metal or other inelastic substance wound around and fastened to the shaft so as to be incapable of turning thereon, and at the same time embedded and enveloped in the roll, as and for the purposes set forth.

2. The method of binding upon the mandrel or shaft, by means of a strip or cord of metal or other inelastic substance wound around it so as to be incapable of turning thereon, a strip or layer of unvulcanized rubber, and finishing the roll upon such strip or layer so bound, substantially in the manner herein described, so that the outer portion of the roll may be united, by the act of vulcanizing, with the strip or layer bound on the shaft.

3. Constructing the roll, for the purposes hereinbefore stated, by combining, with a spirally-grooved mandrel, a preliminary thickness or layer of vulcanizable compound, bound thereon by means of a suitable inelastic cord, braid, or thong, wound over said sheet or layer in the spiral groove around said mandrel, and a suitable cylindrical body of vulcanizable compound, and afterward vulcanizing the whole together, as herein described.

4. A wringer-roll, composed of a vulcanized India-rubber body fixed upon its shaft by means of a cord or thong of suitable material, which, while embedded in and forming part of the body of the roll, is wound spirally around and secured to the shaft, substantially as and for the purposes set forth.

In testimony whereof I have hereunto set my hand in the presence of two subscribing witnesses.

JOHN F. HOLT.

Witnesses:

LELAND D. JENCKES,

LOUIS A. COOK.